(12) United States Patent
Surnilla et al.

(10) Patent No.: US 9,057,330 B2
(45) Date of Patent: Jun. 16, 2015

(54) METHODS AND SYSTEMS FOR HUMIDITY DETECTION VIA AN EXHAUST GAS SENSOR

(71) Applicant: Ford Global Technologies, LLC, Dearborn, MI (US)

(72) Inventors: Gopichandra Surnilla, West Bloomfield, MI (US); Richard E. Soltis, Saline, MI (US); Daniel A. Makled, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 13/973,155

(22) Filed: Aug. 22, 2013

(65) Prior Publication Data
US 2014/0202426 A1    Jul. 24, 2014

Related U.S. Application Data

(63) Continuation-in-part of application No. 13/745,639, filed on Jan. 18, 2013, now Pat. No. 8,857,155.

(51) Int. Cl.
| F01N 3/00 | (2006.01) |
| F02D 41/00 | (2006.01) |
| F02D 17/02 | (2006.01) |
| F01N 13/10 | (2010.01) |
| F01N 13/00 | (2010.01) |
| F02D 41/12 | (2006.01) |
| F02D 41/14 | (2006.01) |
| F02D 19/08 | (2006.01) |

(52) U.S. Cl.
CPC ............ *F02D 17/02* (2013.01); *F02D 41/0082* (2013.01); *F02D 41/123* (2013.01); *F01N 13/107* (2013.01); *F01N 2560/025* (2013.01); *F01N 2560/14* (2013.01); *F01N 13/009* (2014.06); *F01N 13/011* (2014.06); *F02D 2041/1472* (2013.01); *F02D 41/1454* (2013.01); *F02D 2200/0611* (2013.01); *F02D 19/084* (2013.01); *F02D 19/088* (2013.01); *Y02T 10/36* (2013.01)

(58) Field of Classification Search
USPC ................. 60/274, 276, 278, 285; 73/114.72, 73/114.73; 123/692
See application file for complete search history.

(56) References Cited

U.S. PATENT DOCUMENTS

| 5,348,630 | A | 9/1994 | Yagi et al. |
| 8,296,042 | B2 | 10/2012 | Xiao et al. |
| 2010/0236532 | A1 | 9/2010 | Xiao et al. |
| 2011/0132340 | A1 | 6/2011 | Soltis |
| 2011/0132342 | A1* | 6/2011 | Soltis et al. .................... 123/703 |
| 2012/0285761 | A1 | 11/2012 | Lee et al. |

* cited by examiner

*Primary Examiner* — Audrey K Bradley
(74) *Attorney, Agent, or Firm* — Julia Voutyras; Alleman Hall McCoy Russell & Tuttle LLP (57) ABSTRACT

Various methods and system are described for determining ambient humidity via an exhaust gas sensor disposed in an exhaust system of a variable displacement engine. A reference voltage of a sensor coupled to an inactive engine bank is modulated between a first and second voltage to estimate ambient humidity. Concurrently, a reference voltage of a sensor coupled to an active engine bank is modulated between the first and second voltage, or at the first voltage, to estimate fuel alcohol content, or exhaust air-fuel ratio, respectively.

20 Claims, 6 Drawing Sheets

METHODS AND SYSTEMS FOR HUMIDITY DETECTION VIA AN EXHAUST GAS SENSOR

CROSS REFERENCE TO RELATED APPLICATIONS

The present application is a continuation-in-part of U.S. patent application Ser. No. 13/745,639, filed on Jan. 18, 2013, the entire contents of which are incorporated herein by reference for all purposes.

TECHNICAL FIELD

The present application relates generally to ambient humidity detection via an exhaust gas sensor coupled in an exhaust system of an internal combustion engine.

BACKGROUND AND SUMMARY

During engine non-fueling conditions in which at least one intake valve and one exhaust valve are operating, such as deceleration fuel shut off (DFSO), ambient air may flow through engine cylinders and into the exhaust system. In some examples, an exhaust gas sensor may be utilized to determine ambient humidity during the engine non-fueling conditions. However, the need to wait for a DFSO condition can delay the humidity measurement. In addition, it may take a long time for the exhaust flow to be devoid of hydrocarbons during the engine non-fueling conditions. Further, during the DFSO, when an intake throttle is closed, large manifold vacuum is generated which can lead to ingestion of a large amount of PCV. The ingested PCV can impact the sensor output and confound the humidity measurement. Overall, an accurate indication of ambient humidity may be delayed.

The inventors herein have recognized the above issue and have devised an approach to at least partially address it. Thus, a method for an engine system which includes an exhaust gas sensor is disclosed. In one example, the method comprises: selectively deactivating a first group of cylinders while maintaining a second group of cylinders active, modulating a reference voltage of a first exhaust gas sensor coupled downstream of the first group of cylinders, inferring an ambient humidity based on sensor output generated by the first sensor responsive to the modulating; and adjusting an engine operating parameter of the second group of cylinders based on the inferred ambient humidity. In this way, the humidity estimation may be performed in the deactivated bank of a variable displacement engine, reducing the need to wait for a DFSO condition.

As an example, during low load conditions, cylinders on a first engine bank may be selectively deactivated while cylinders on a second engine bank remain active. This reduces pumping losses and improves engine efficiency. While fuel and spark to the first engine bank is deactivated, a first exhaust gas oxygen sensor coupled downstream of the first engine bank (but not the second engine bank) may be modulated for ambient humidity detection. Specifically, each of a first, lower voltage (e.g., 450 mV) and a second, higher voltage (e.g., 1080 mV) may be alternately applied on the sensor and a sensor output each voltage (e.g., a pumping current at each voltage) may be noted. Based on a difference between the first and second pumping currents, an ambient humidity may be estimated. Concurrently, while the second engine bank is active, a second exhaust gas oxygen sensor coupled downstream of the second engine bank (but not the second engine bank) may be modulated for fuel ethanol content detection and/or exhaust air-fuel ratio determination. Specifically, during a first condition, only the first voltage may be applied on the second sensor and an air-fuel ratio may be estimated based on a first pumping current output by the sensor. Then, during a second condition, each of the first and second voltage may be alternately applied on the second sensor and fuel ethanol content may be estimated based on a difference between the first and second pumping currents output by the sensor at the first and second voltages, respectively. An engine operating parameter of the active bank (e.g., fuel injection amount, spark timing, EGR amount, etc.) may then be adjusted based on the ambient humidity estimated on the inactive bank, as well as the air-fuel ratio and ethanol content estimated on the active bank.

In this way, by modulating the reference voltage and determining the change in pumping current at an exhaust gas oxygen sensor coupled to a selectively deactivated engine bank, the need to wait for a DFSO condition is reduced while also nullifying the effect of any changing air fuel ratio. By not waiting for a DFSO condition, the PCV impact on humidity estimation is also reduced. Further, the ambient humidity may be determined in a shorter amount of time, as the exhaust air fuel ratio does not have to be stable before an accurate indication of ambient humidity may be determined. Further still, by concurrently modulating the reference voltage and determining the change in pumping current at an exhaust gas oxygen sensor coupled to the active engine bank, fuel ethanol content estimation and air-fuel ratio estimation can be performed at the same time as ambient humidity estimation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
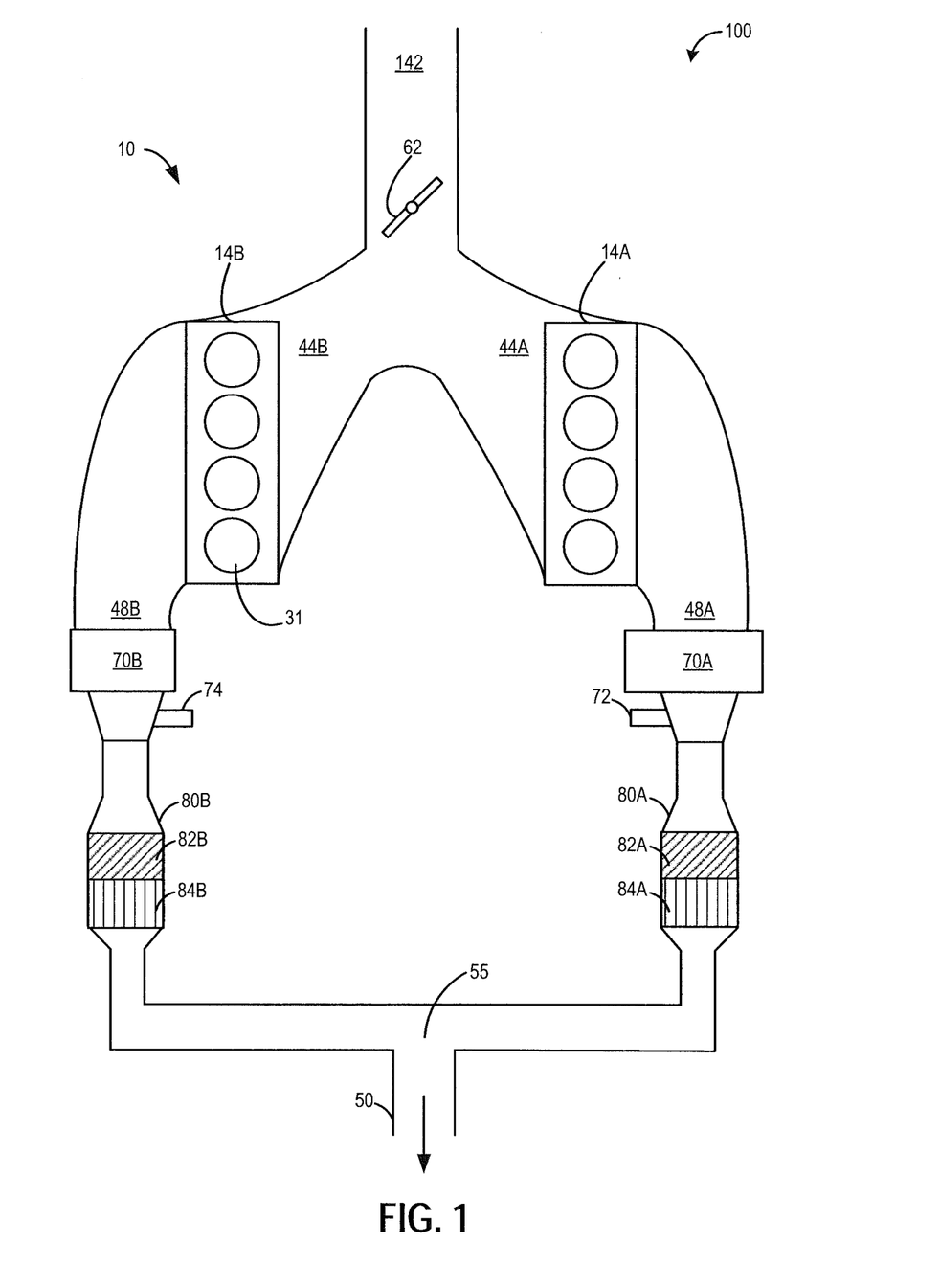
FIG. 1 shows an example embodiment of an engine with selectively deactivatable cylinders.
Figure 2:
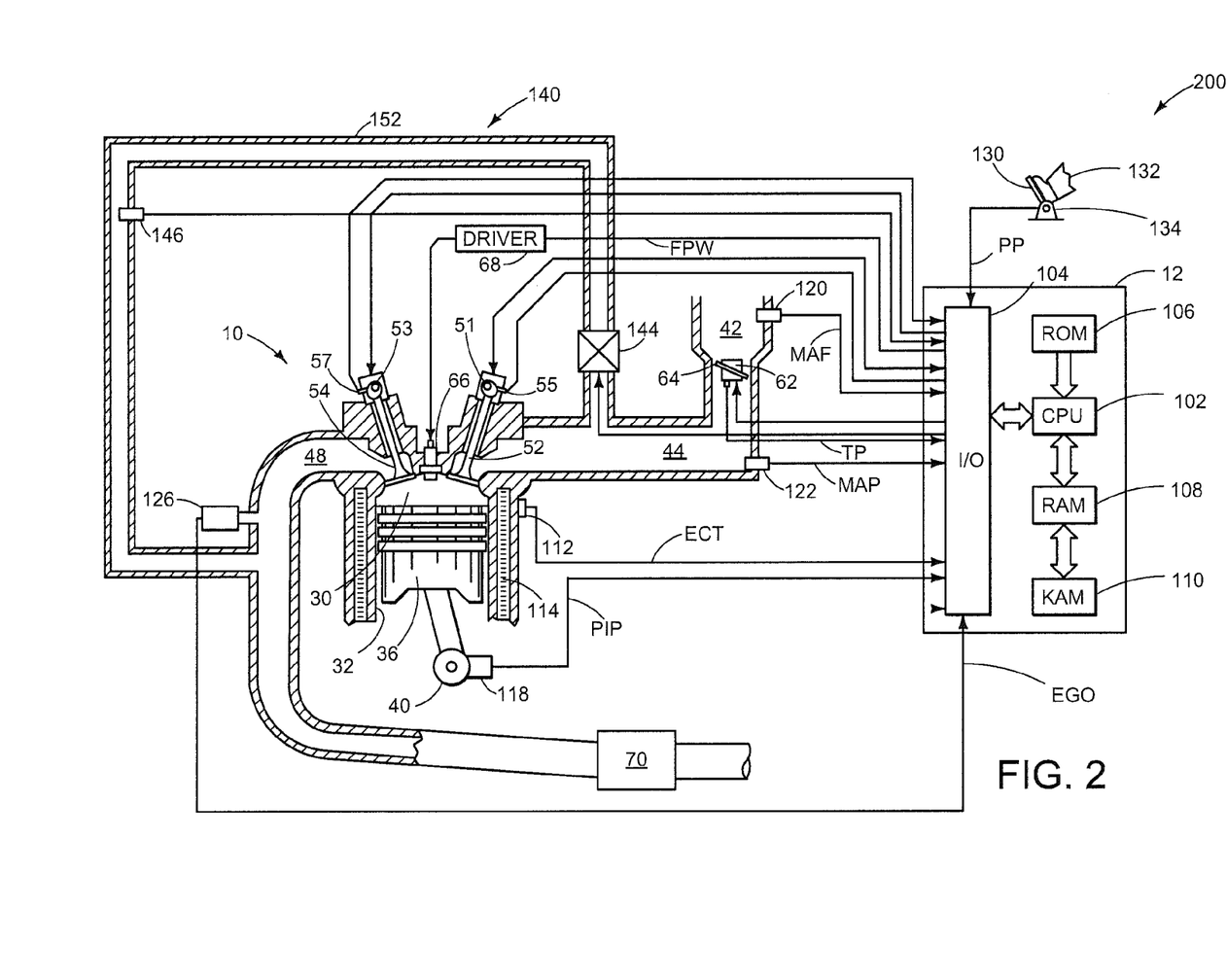
FIG. 2 shows an example embodiment of a combustion chamber in an engine system including an exhaust system and an exhaust gas recirculation system.

Methods and systems are provided for estimating humidity in an inactive bank of a variable displacement engine (VDE), such as the engine of FIGS. 1-2. During a VDE mode of engine operation, an exhaust gas oxygen sensor, such as the sensor of FIG. 3, coupled downstream of an inactive engine bank may be used for humidity detection while an exhaust gas oxygen sensor coupled downstream of the active bank is used for air-fuel ratio and fuel ethanol content estimation. A controller may be configured to perform a routine, such as the routine of FIGS. 4-5, to modulate an exhaust gas oxygen sensor coupled to an inactive engine bank during a VDE mode of engine operation to estimate ambient humidity, while modulating an exhaust gas oxygen sensor coupled to the active engine bank to estimate burned fuel alcohol (e.g., ethanol) content and measure an exhaust air-fuel ratio. Engine operating parameters of the active bank during the VDE mode of operation, as well as of both banks during a subsequent non-VDE of operation are adjusted based on the estimated humidity, air-fuel ratio, and fuel alcohol content (FIG. 6). In addition, the reactivation of the inactive bank may be adjusted based at least on the humidity measurement.

FIG. 1 shows an example embodiment 100 of engine 10 wherein the engine is configured as a variable displacement engine (VDE). Variable displacement engine 10 includes a plurality of combustion chambers or cylinders 31. The plurality of cylinders 31 of engine 10 are arranged as groups of cylinders on distinct engine banks. In the depicted example, engine 10 includes two engine banks 14A, 14B. Thus, the cylinders are arranged as a first group of cylinders (four cylinders in the depicted example) arranged on first engine bank 14A and a second group of cylinders (four cylinders in the depicted example) arranged on second engine bank 14B. It will be appreciated that while the embodiment depicted in FIG. 1 shows a V-engine with cylinders arranged on different banks, this is not meant to be limiting, and in alternate embodiments, the engine may be an in-line engine with all engine cylinders on a common engine bank.

Variable displacement engine 10 can receive intake air via an intake passage 142 communicating with branched intake manifold 44A, 44B. Specifically, first engine bank 14A receives intake air from intake passage 142 via first intake manifold 44A while second engine bank 14B receives intake air from intake passage 142 via second intake manifold 44B. While engine banks 14A, 14B are shown with distinct intake manifolds, it will be appreciated that in alternate embodiments, they may share a common intake manifold or a portion of a common intake manifold. The amount of air supplied to the cylinders of the engine can be controlled by adjusting a position of throttle 62. Additionally, an amount of air supplied to each group of cylinders on the specific banks can be adjusted by varying an intake valve timing of one or more intake valves coupled to the cylinders.

Combustion products generated at the cylinders of first engine bank 14A are directed to one or more exhaust catalysts in first exhaust manifold 48A where the combustion products are treated before being vented to the atmosphere. A first emission control device 70A is coupled to first exhaust manifold 48A. First emission control device 70A may include one or more exhaust catalysts, such as a close-coupled catalyst. In one example, the close-coupled catalyst at emission control device 70A may be a three-way catalyst. Exhaust gas generated at first engine bank 14A is treated at emission control device 70A before being directed to first underbody emission control device 80A. First underbody emission control device 80A may include a first underbody exhaust catalyst 82A and a second underbody exhaust catalyst 84A. In one example, first underbody exhaust catalyst 82A includes an SCR catalyst configured for selective catalytic reduction wherein NOx species are reduced to nitrogen using ammonia. As another example, second underbody exhaust catalyst 84A includes a three-way catalyst. First underbody exhaust catalyst 82A may be positioned upstream of the second underbody exhaust catalyst 84A (in a direction of exhaust flow) in the underbody emission control device 80A but downstream of a third close-coupled exhaust catalyst (included in emission control device 70A). Exhaust that is treated upon passage through first emission control device 70A and first underbody emission control device 80A is then directed towards exhaust junction 55 along first exhaust manifold 48A. From there, the exhaust can be directed to the atmosphere via common exhaust passage 50.

Combustion products generated at the cylinders of second engine bank 14B are exhausted to the atmosphere via second exhaust manifold 48B. A second emission control device 70B is coupled to second exhaust manifold 48B. Second emission control device 70B may include one or more exhaust catalysts, such as a close-coupled catalyst. In one example, the close-coupled catalyst at emission control device 70A may be a three-way catalyst. Exhaust gas generated at second engine bank 14B is treated at emission control device 70B before being directed to second underbody emission control device 80B. Second underbody emission control device 80B may also include a first underbody exhaust catalyst 82B and a second underbody exhaust catalyst 84B.

While FIG. 1 shows each engine bank coupled to respective underbody emission control devices, in alternate embodiments, each engine bank may be coupled to respective emission control devices 70A, 70B but to a common underbody emission control device positioned downstream of exhaust junction 55 and a common exhaust passage.

Various sensors may be coupled to engine 10. For example, a first exhaust gas sensor 72 may be coupled to the first exhaust manifold 48A of first engine bank 14A, downstream of first emission control device 70A while a second exhaust gas sensor 74 is coupled to the second exhaust manifold 48B of second engine bank 14B, downstream of second emission control device 70B. In further embodiments, additional exhaust gas sensors may be coupled upstream of the emission control devices. Still other sensors, such as temperature sensors, may be included, for example, coupled to the underbody emission control device(s). As elaborated at FIGS. 2-3, the exhaust gas sensors 72 and 74 may include exhaust gas oxygen sensors, such as EGO, HEGO, or UEGO sensors.

One or more engine cylinders may be selectively deactivated during selected engine operating conditions. For example, during low engine loads, one or more cylinders of a selected engine bank may be selectively deactivated. Even though the engine load is lower, by deactivating selected cylinders, the average cylinder load of the remaining active cylinders is increased, improving pumping efficiency. The selective cylinder deactivation may include deactivating fuel and spark on the selected engine cylinders (or a selected engine bank if an entire bank is deactivated, such as in flat crankshaft arrangements). In addition, an intake and/or exhaust valve timing may be adjusted so that substantially no air is pumped through the inactive engine bank while air continues to flow through the active engine bank. In some embodiments, the deactivated cylinders may have cylinder valves held closed during one or more engine cycles, wherein the cylinder valves are deactivated via hydraulically actuated lifters, or via a cam profile switching (CPS) mechanism in which a cam lobe with no lift is used for deactivated valves. In one example, an engine controller may selectively deactivate all the cylinders of a given engine bank (either 14A or 14B) during a shift to VDE mode and then reactivate the cylinders during a shift back to non-VDE mode.

Figure 4:
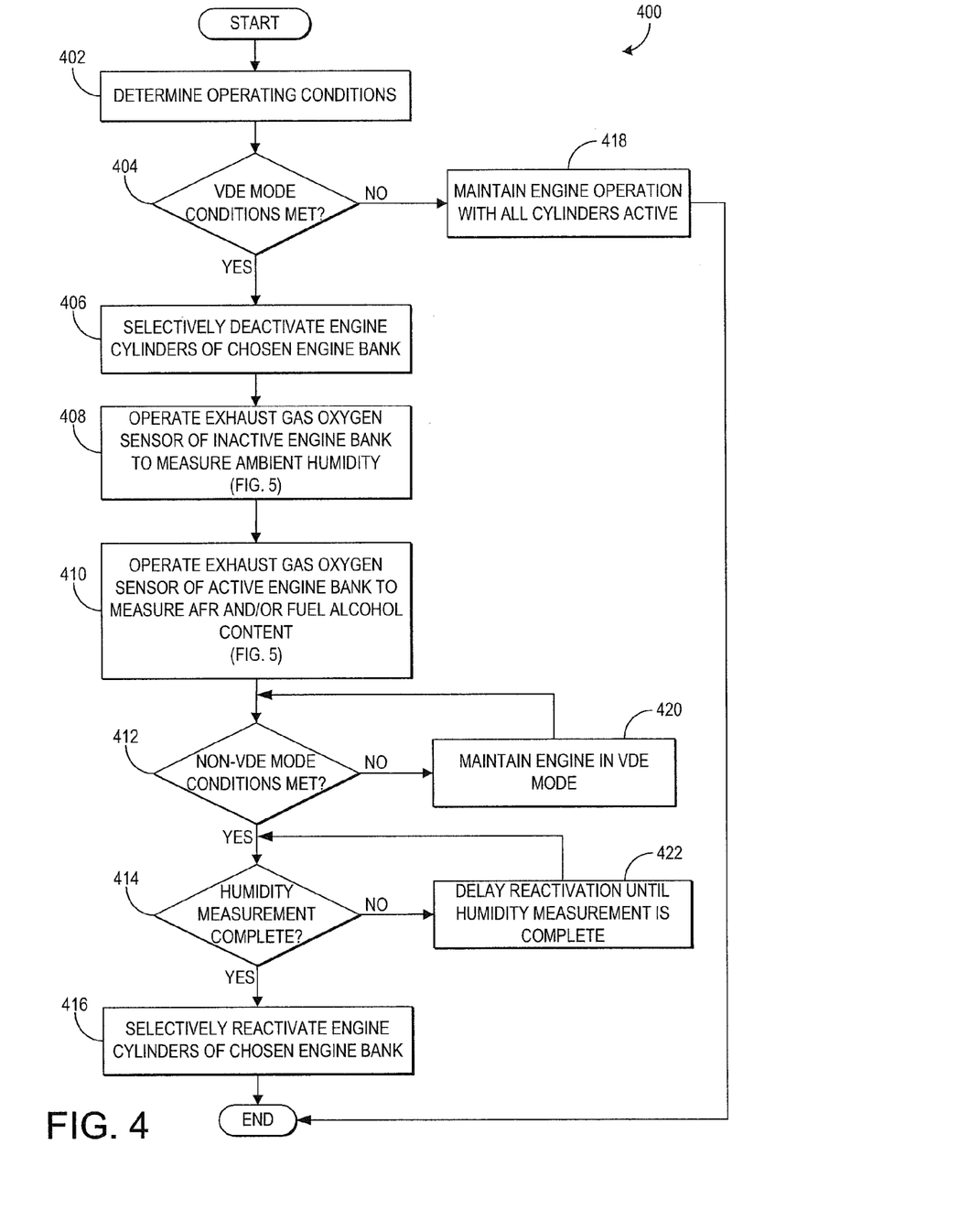
FIG. 4 is a flow chart illustrating a routine for operating one or more exhaust gas sensors coupled to a variable displacement engine.

As elaborated at FIG. 4, a controller may use an exhaust gas sensor coupled to the inactive engine bank during a VDE mode of operation to estimate ambient humidity. Specifically, a reference voltage of the exhaust gas sensor coupled to the inactive bank may be modulated, and an ambient humidity may be estimated based on a change in pumping current output at the reference voltages. By performing the estimation (which requires non-fueling conditions to be present) using the exhaust gas sensor coupled to the inactive bank during a VDE mode of engine operation, the need to wait for a DFSO condition for performing the humidity estimation is reduced. In addition, the effect of any changing air fuel ratio on the sensor output is nullified. Further, by not waiting for a DFSO condition, where the intake throttle is closed and the manifold vacuum is raised, the impact of PCV hydrocarbons on the sensor output is also reduced. Overall, the ambient humidity may be determined in a shorter amount of time, as the exhaust air fuel ratio does not have to be stable before an accurate indication of ambient humidity can be determined.

While humidity estimation is performed on the inactive engine bank, fuel ethanol content estimation and/or exhaust air-fuel ratio estimation (which require fueling conditions) may be concurrently performed on the active bank. Specifically, by concurrently modulating the reference voltage and determining the change in pumping current at an exhaust gas oxygen sensor coupled to the active engine bank, fuel ethanol content estimation and air-fuel ratio estimation can be performed at the same time as ambient humidity estimation. By enabling the estimations to be performed concurrently, rather than sequentially, all the estimations can be completed in a shorter amount of time, without losing accuracy of results.

For example, during a VDE mode of operation, all cylinders of engine bank 14A may be deactivated while all cylinders of engine bank 14B are maintained active. During the VDE mode of operation, the reference voltage of exhaust gas oxygen sensor 72 may be modulated between a first, lower reference voltage (that does not enable water to dissociate) and a second, higher reference voltage (that does enable water to dissociate). An output of sensor 72 at the two reference voltages is then used to estimate ambient humidity. At the same time, the reference voltage of exhaust gas oxygen sensor 74 may be modulated between the first and second reference voltages and an output of sensor 74 at the two voltages can be used to estimate an ethanol content of the fuel burned in the engine. Additionally, before or after the ethanol estimation, the first reference voltage may be applied to exhaust gas oxygen sensor 74 and an output of sensor 74 at the reference voltage may be used to estimate an exhaust air-fuel ratio. Fuel injection to engine bank 14B may then be adjusted based on one or more of the estimated ambient humidity, exhaust air-fuel ratio, and fuel ethanol content. In addition, reactivation of the engine bank 14A may be delayed at least until the ambient humidity estimation is complete. Further, following the reactivation, fuel injection, spark timing, and EGR flow to both engine banks may be adjusted based on the estimated ambient humidity, exhaust air-fuel ratio, and fuel ethanol content.

Continuing to FIG. 2, a schematic diagram showing one cylinder of a multi-cylinder engine 10 in an engine system 200, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The intake passage 42 may include a mass air flow sensor 120 and a manifold air pressure sensor 122 for providing respective signals MAF and MAP to the controller 12.

An exhaust gas sensor 126 is shown coupled to the exhaust passage 48 upstream of an emission control device 70. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The emission control device 70 is shown arranged along the exhaust passage 48 downstream of the exhaust gas sensor 126. The device 70 may be a three way catalyst (TWC), $NO_x$ trap, various other emission control devices, or combinations thereof. In some embodiments, during operation of the engine 10, the emission control device 70 may be periodically reset by operating at least one cylinder of the engine within a particular air/fuel ratio.

Further, in the disclosed embodiments, an exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Further, an EGR sensor 146 may be arranged within the EGR passage 152 and may provide an indication of one or more of pressure, temperature, and constituent concentration of the exhaust gas. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 2 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; and absolute manifold pressure signal, MAP, from the sensor 122. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

As described above, FIG. 2 shows only one cylinder of a multi-cylinder engine, and each cylinder may similarly include its own set of intake/exhaust valves, fuel injector, spark plug, etc.

Figure 3:
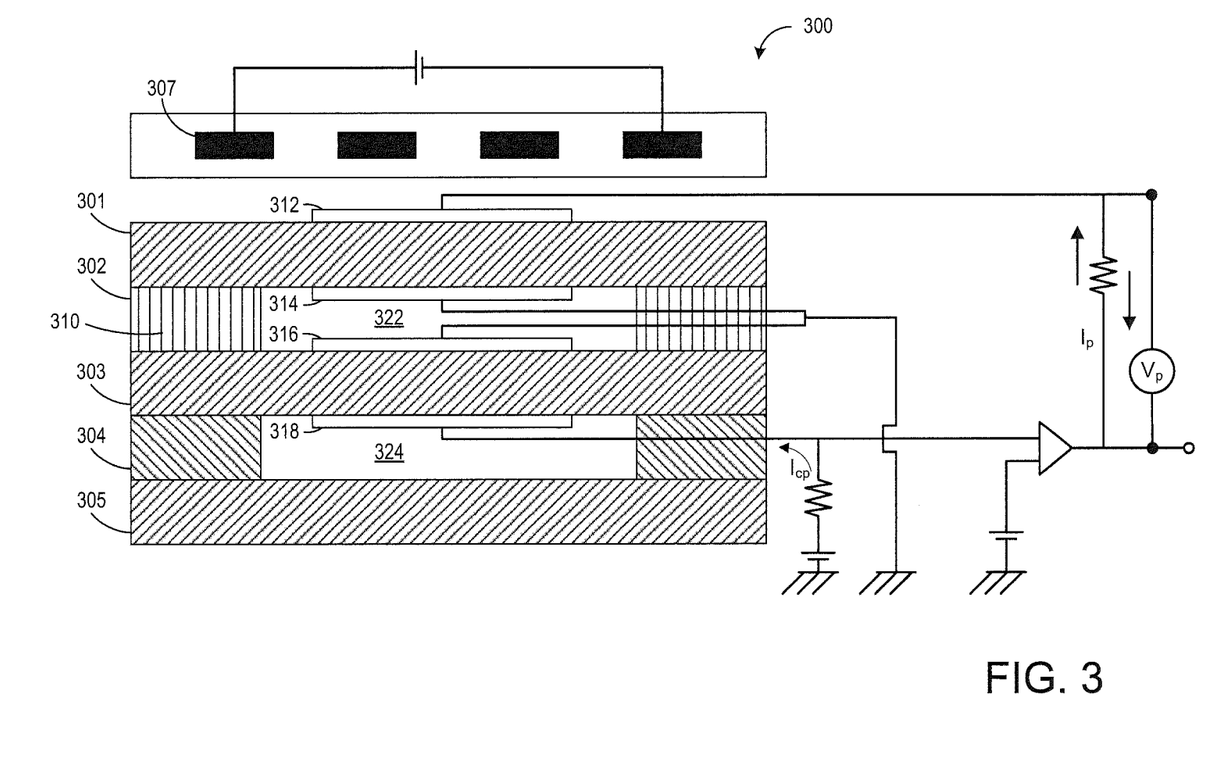
FIG. 3 shows a schematic diagram of an example exhaust gas sensor.

FIG. 3 shows a schematic view of an example embodiment of an exhaust gas sensor, such as a UEGO sensor 300 configured to measure a concentration of oxygen ($O_2$) in an exhaust gas stream. The sensor 300 may operate as the exhaust gas sensor 126 described above with reference to FIG. 2, or any of exhaust gas sensors 72 and 74 described above with reference to FIG. 1, for example. The sensor 300 comprises a plurality of layers of one or more ceramic materials arranged in a stacked configuration. In the embodiment of FIG. 3, five ceramic layers are depicted as layers 301, 302, 303, 304, and 305. These layers include one or more layers of a solid electrolyte capable of conducting ionic oxygen. Examples of suitable solid electrolytes include, but are not limited to, zirconium oxide-based materials. Further, in some embodiments such as that shown in FIG. 3, a heater 307 may be disposed in thermal communication with the layers to increase the ionic conductivity of the layers. While the depicted UEGO sensor 300 is formed from five ceramic layers, it will be appreciated that the UEGO sensor may include other suitable numbers of ceramic layers.

The layer 302 includes a material or materials creating a diffusion path 310. The diffusion path 310 is configured to introduce exhaust gases into a first internal cavity 322 via diffusion. The diffusion path 310 may be configured to allow one or more components of exhaust gases, including but not limited to a desired analyte (e.g., $O_2$), to diffuse into the internal cavity 322 at a more limiting rate than the analyte can be pumped in or out by pumping electrodes pair 312 and 314. In this manner, a stoichiometric level of $O_2$ may be obtained in the first internal cavity 322.

The sensor 300 further includes a second internal cavity 324 within the layer 304 separated from the first internal cavity 322 by the layer 303. The second internal cavity 324 is configured to maintain a constant oxygen partial pressure equivalent to a stoichiometric condition, e.g., an oxygen level present in the second internal cavity 324 is equal to that which the exhaust gas would have if the air-fuel ratio was stoichiometric. The oxygen concentration in the second internal cavity 324 is held constant by pumping current $I_{cp}$. Herein, the second internal cavity 324 may be referred to as a reference cell.

A pair of sensing electrodes 316 and 318 is disposed in communication with first internal cavity 322 and the reference cell 324. The sensing electrodes pair 316 and 318 detects a concentration gradient that may develop between the first internal cavity 322 and the reference cell 324 due to an oxygen concentration in the exhaust gas that is higher than or lower than the stoichiometric level. A high oxygen concentration may be caused by a lean exhaust gas mixture, while a low oxygen concentration may be caused by a rich mixture, for example.

The pair of pumping electrodes 312 and 314 is disposed in communication with the internal cavity 322, and is configured to electrochemically pump a selected gas constituent (e.g., $O_2$) from the internal cavity 322 through the layer 301 and out of the sensor 300. Alternatively, the pair of pumping electrodes 312 and 314 may be configured to electrochemically pump a selected gas through the layer 301 and into the internal cavity 322. Herein, the pumping electrodes pair 312 and 314 may be referred to as an $O_2$ pumping cell.

The electrodes 312, 314, 316, and 318 may be made of various suitable materials. In some embodiments, the electrodes 312, 314, 316, and 318 may be at least partially made of a material that catalyzes the dissociation of molecular oxygen. Examples of such materials include, but are not limited to, electrodes containing platinum and/or gold.

The process of electrochemically pumping the oxygen out of or into the internal cavity 322 includes applying an electric current $I_p$ across the pumping electrodes pair 312 and 314. The pumping current $I_p$ applied to the $O_2$ pumping cell pumps oxygen into or out of the first internal cavity 322 in order to maintain a stoichiometric level of oxygen in the cavity pumping cell. The pumping current $I_p$ is proportional to the concentration of oxygen in the exhaust gas. Thus, a lean mixture will cause oxygen to be pumped out of the internal cavity 322 and a rich mixture will cause oxygen to be pumped into the internal cavity 322.

A control system (not shown in FIG. 3) generates the pumping voltage signal $V_p$ as a function of the intensity of the pumping current $I_p$ required to maintain a stoichiometric level within the first internal cavity 322.

It should be appreciated that the UEGO sensor described herein is merely an example embodiment of a UEGO sensor, and that other embodiments of UEGO sensors may have additional and/or alternative features and/or designs.

FIG. 4 shows a flow chart illustrating a routine 400 for operating one or more exhaust gas sensors coupled to a VDE. Specifically, the routine determines whether VDE mode conditions are met and controls the engine system accordingly. For example, if VDE conditions are met, a chosen bank of engine cylinders (e.g., a first bank or a second bank) is deactivated and exhaust gas sensors corresponding to each bank of cylinders are operated to measure ambient humidity, fuel alcohol content, and/or air-fuel ratio. For example, the exhaust gas sensor coupled to the inactive bank measures ambient humidity while the exhaust gas sensor coupled to the active bank measures fuel alcohol content and/or air-fuel ratio.

At 402 of routine 400, engine operating conditions are determined. As non-limiting examples, the operating conditions may include engine load, ambient temperature, spark timing, valve timing, fuel injection timing, etc.

Once the operating conditions are determined, the routine proceeds to 404 where it is determined if VDE mode conditions are met. As one example, VDE mode conditions may include low engine load operation. For example, when one bank of cylinders is deactivated, the average cylinder load of the remaining cylinders in the active engine bank is increased. Thus, if the engine load is low, the load of the active cylinders may not get too high even though the load is increased in the active cylinders.

If it is determined that VDE operating mode conditions are not met, the routine moves to 418 where engine operation with all cylinders active is maintained. For example, all cylinders of both engine banks remain active such that combustion is carried out in each of the cylinders.

On the other hand, if it is determined that the VDE mode conditions are met, the routine continues to 406 where engine cylinders of a chosen engine bank are selectively deactivated. As an example, deactivating the engine cylinders of the chosen bank may include deactivating fuel (e.g., via selectively deactivatable fuel injectors) and spark on the selected engine bank. In addition, an intake and/or exhaust valve timing may be adjusted so that substantially no air is pumped through the inactive engine bank while air continues to flow through the active engine bank.

Once the selected cylinders are deactivated, the routine proceeds to 408 where the exhaust gas oxygen sensor of the inactive engine bank is operated to measure ambient humidity, as will be described in greater detail with reference to FIG. 5 below. As described above, by measuring the ambient humidity via the exhaust gas sensor coupled to the inactive bank of cylinders, the need to wait for a DFSO condition to measure the ambient humidity is reduced. Additionally, by not waiting for a DFSO condition, the PCV impact on humidity estimation is also reduced. Further, the effect of a changing air-fuel ratio on the sensor output is nullified, as combustion is not carried out in the cylinders of the inactive bank. As such, the ambient humidity may be determined in a shorter amount of time, as the exhaust air fuel ratio does not have to be stable before an accurate indication of ambient humidity can be determined.

At 410, the exhaust gas oxygen sensor of the active engine bank is operated to measure air-fuel ratio and/or fuel alcohol content, as will be described in greater detail with reference to FIG. 5 below. As described above, because the ambient humidity is measured via the sensor coupled to the inactive engine bank and the fuel alcohol content and air-fuel ratio are measured via the sensor coupled to the active engine bank, the measurements of ambient humidity and fuel alcohol content and/or air-fuel ratio may be carried out at the same time. In this way, the measurement may be completed in less time while maintaining accuracy.

At 412, it is determined if non-VDE mode conditions are met. Non-VDE mode conditions may include, high engine load operation, for example. If is determined that non-VDE mode conditions are not met, the routine moves to 420 and engine operation is maintained in VDE mode until non-VDE mode conditions are met.

On the other hand, if it is determined that non-VDE mode conditions are met, the routine continues to 414 where it is determined if the humidity measurement is complete. As an example, it may be determined that the humidity measurement is complete when modulation of a reference voltage of the exhaust gas sensor is complete. If it is determined that the humidity measurement is not complete, the routine moves to 422 where cylinder reactivation is delayed until the humidity measurement is complete. For example, the deactivated bank of cylinders remains deactivated until sensor reference voltage modulation ends or the control system receives an indication of ambient humidity.

If, instead, it is determined that the humidity measurement is complete, the routine proceeds to 416 where engine cylinders of the chosen engine bank are selectively reactivated. For example, the cylinders may be reactivated in a particular order based on operating conditions or to prevent knock, for example. In some examples, the reactivation of the cylinders may be delayed in response to the ambient humidity being higher than a threshold humidity. As an example, the threshold humidity may be based on a knock limit of the engine.

Thus, during a VDE mode of operation in which one bank of engine cylinders is deactivated such that combustion is not carried out in the cylinders of the deactivated bank, measurements of ambient humidity and fuel alcohol content or air-fuel ratio may be performed concurrently. In this way, the measurements can be performed in a shorter amount of time without a reduction in accuracy of the measurements. Further, the VDE mode of operation may be continued until the ambient humidity measurement is completed.

Figure 5:
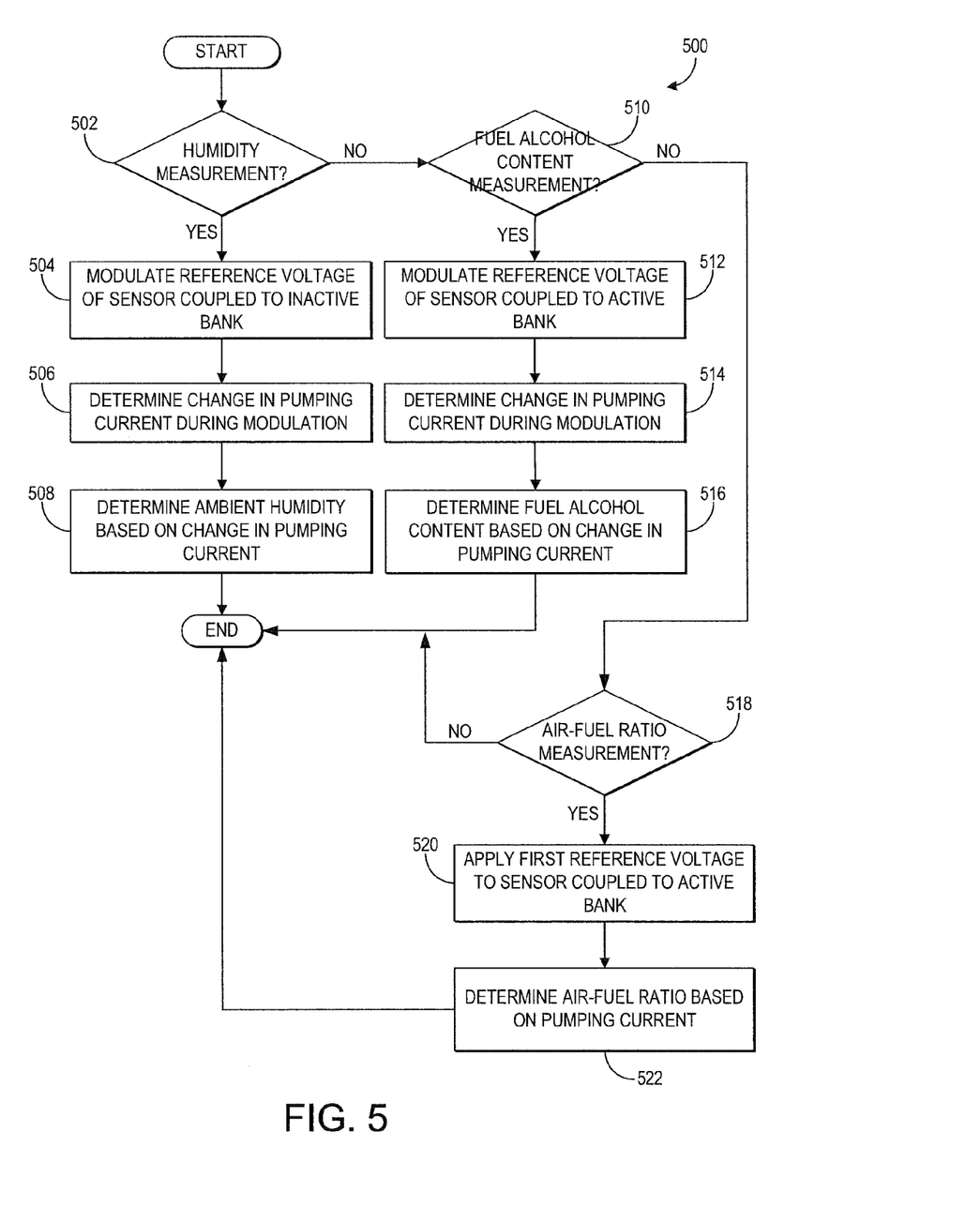
FIG. 5 is a flow chart illustrating a routine for determining ambient humidity, exhaust air-fuel ratio and/or burned fuel alcohol content based on the exhaust gas sensors of the variable displacement engine.
Figure 6:
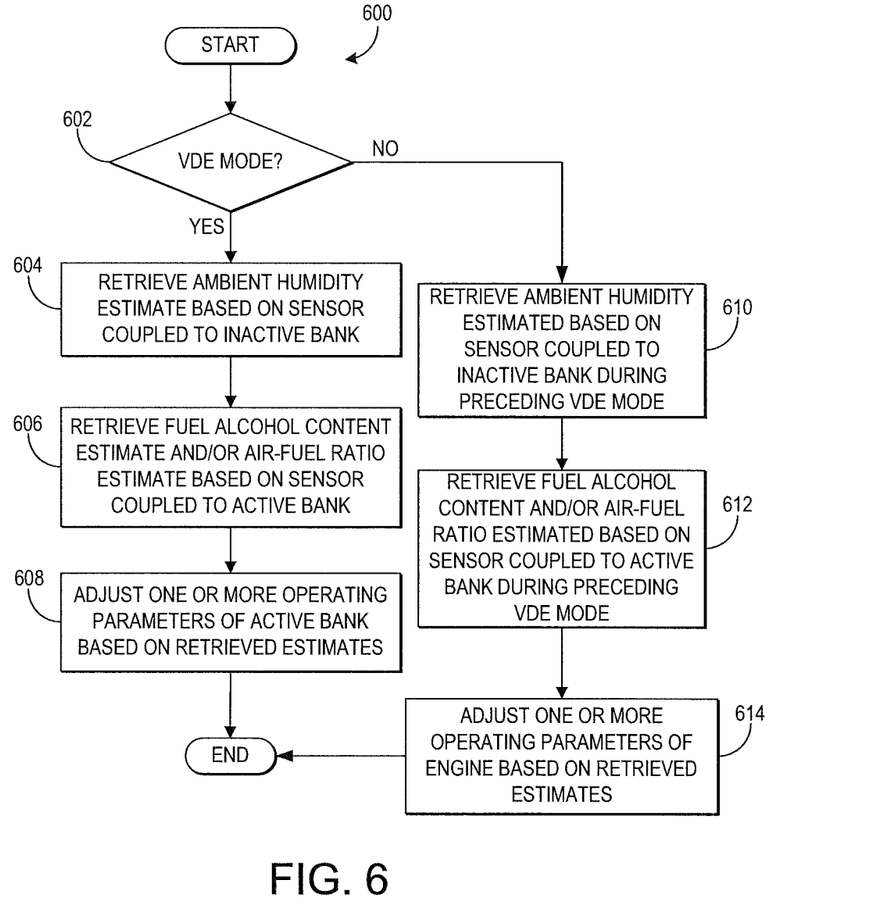
FIG. 6 is a flow chart illustrating a routine for adjusting engine operating parameters based on ambient humidity, exhaust air-fuel ratio and/or burned fuel alcohol content estimated by the exhaust gas sensors.

FIG. 5 shows a flow chart illustrating a routine 500 for determining ambient humidity, exhaust air-fuel ratio, and/or burned fuel alcohol content based on the exhaust gas sensor of a variable displacement engine, such as the engine 10 described above with reference to FIGS. 1 and 2. Specifically, the routine determines if each of the measurements is desired and a reference voltage is applied to the corresponding exhaust gas sensor accordingly. For example, the reference voltage is applied to the sensor of the inactive engine bank and modulated between a first and second voltage to determine the ambient humidity. To determine the fuel alcohol content and the air-fuel ratio, the reference voltage is applied to the sensor of the active engine bank. The reference voltage is modulated between a first and second voltage to determine the fuel alcohol content and applied at the first voltage to determine the air-fuel ratio.

At 502 of routine 500, it is determined if a humidity measurement is desired. For example, the humidity measurement may be desired when a measurement of ambient humidity has not been obtained over a duration greater than a threshold duration or responsive to changing ambient conditions, such as a change in ambient temperature.

If it is determined that the humidity measurement is desired, the routine continues to 504 where the reference voltage of the exhaust gas sensor coupled to the inactive bank of engine cylinders is modulated between a first voltage and a second voltage, where the first voltage is lower than a second voltage. As a non-limiting example, the first voltage may be 450 mV and the second voltage may be 950 mV. At 450 mV, for example, the pumping current may be indicative of an amount of oxygen in the exhaust gas. At 950 mV, water molecules may be dissociated such that the pumping current is indicative of the amount of oxygen in the exhaust gas plus an amount of oxygen from dissociated water molecules. The first voltage may be a voltage at which a concentration of oxygen in the exhaust gas may be determined, for example, while the second voltage may be a voltage at which water molecules may be dissociated. In this way, a humidity of the exhaust gas may be determined based on the water concentration.

At 506, a change in pumping current during the modulation is determined. For example, the change in pumping current is the difference between the pumping current output responsive to application of the first reference voltage and the pumping current output responsive to application of the second reference voltage.

At 508, the ambient humidity is determined based on the pumping current. By modulating the reference voltage and determining a corresponding change in pumping current, an estimate of the ambient humidity (e.g., the concentration of water molecules) may be inferred.

Referring back to 502, if it is determined that a humidity measurement is not desired, the routine 500 moves to 510 where it is determined if a fuel alcohol content measurement is desired. For example, an estimate of the fuel alcohol content may be desired after a fuel tank refill.

If it is determined that a fuel alcohol content measurement is desired, the routine 500 continues to 512 where the reference voltage of the exhaust gas sensor coupled to the active cylinder bank is modulated between a first voltage and a second, higher voltage. As a non-limiting example, the first voltage may be 450 mV and the second voltage may be 1080 mV. For example, at 1080 mV, carbon dioxide ($CO_2$) molecules may be dissociated in addition to water molecules.

At 514, the change in pumping current during the modulation is determined. For example, the change in pumping current is the difference between the pumping current output responsive to application of the first reference voltage and the pumping current output responsive to application of the second reference voltage.

Once the change in pumping current is determined, the alcohol content is determined based on the change in pumping current determined at 516. By modulating the reference voltage and determining a corresponding change in pumping current, an estimate of the amount of alcohol (e.g., ethanol) in the fuel may be inferred.

Referring back to 510, if it determined that a fuel alcohol content measurement is not desired, the routine moves to 518 where it is determined if an air-fuel ratio measurement is desired. For example, an exhaust air-fuel ratio measurement may be desired such that engine operating parameters (e.g., fuel injection, etc.) may be adjusted for desired engine operation. If it is determined that an air-fuel ratio measurement is not desired, the routine ends.

On the other hand, if it is determined that an air-fuel ratio measurement is desired, the routine proceeds to 520 where a first reference voltage is applied to the exhaust gas sensor coupled to the active cylinder bank. For example, the first reference voltage may only be high enough to dissociate oxygen molecules (and not water molecules or carbon dioxide molecules). As one non-limiting example, the first reference voltage may be 450 mV.

At 522, the air-fuel ratio is determined based on the pumping current output by the exhaust gas sensor responsive to the applied reference voltage. For example, the pumping current is indicative of the amount of oxygen in the exhaust gas, as described above.

Thus, each of exhaust gas sensors coupled to the active engine bank and the inactive engine bank may be modulated between first and second reference voltages such that estimates of fuel alcohol content and ambient humidity, respectively, may be inferred. Further, the exhaust gas sensor coupled to the active engine bank may output a signal indicative of air-fuel ratio responsive to application of the first reference voltage. The estimates may be obtained concurrently, as the ambient humidity and fuel alcohol content and air-fuel ratio are based on output from sensor coupled to different engine banks.

FIG. 6 shows a flow chart illustrating a routine 600 for adjusting engine operating parameters based on ambient humidity, exhaust air-fuel ratio, and/or burned fuel alcohol content estimated by one or more exhaust gas sensors, such as the exhaust gas sensor 300 described above with reference to FIG. 3. Specifically, the routine determines the humidity, fuel alcohol content, and/or air-fuel ratio and adjusts one or more operating parameters based on the humidity, fuel alcohol content, and/or air-fuel ratio. For example, an increase in water concentration of the air surrounding the vehicle may dilute a charge mixture delivered to a combustion chamber of the engine. If one or more operating parameters are not adjusted in response to the increase in humidity, engine performance and fuel economy may decrease and emissions may increase; thus, the overall efficiency of the engine may be reduced.

At 602 of routine 600, it is determined if the engine is operating in VDE mode. For example, it may be determined that the engine is operating in VDE mode if one or more cylinders or an entire engine bank is deactivated and combustion is not carried out in the cylinders.

If it is determined that the engine is operating in VDE mode, the routine continues to 604 where the ambient humidity estimate based on the exhaust gas sensor coupled to inactive cylinder bank is retrieved. For example, the ambient humidity estimate is determined at 508 of routine 500 described above.

At 606, the fuel alcohol content estimate and/or air-fuel ratio estimate based on the exhaust gas sensor coupled to the active cylinder bank is retrieved. For example, the fuel alcohol content and air-fuel ratio are determined at 516 and 522, respectively of routine 500 described above.

At 608, one or more engine operating parameters of the active cylinder bank is adjusted based on the retrieved estimates. As examples, the engine operating parameters may include amount of exhaust gas recirculation, spark timing, fuel injection amount, engine air-fuel ratio, etc. As described above, in internal combustion engines, it is desirable to schedule engine operating parameters, such as spark timing, in order to optimize engine performance. In some embodiments, only one parameter may be adjusted responsive to the humidity, fuel alcohol content, and/or air-fuel ratio. In other embodiments, any combination or sub-combination of these operating parameters may be adjusted in response to measured fluctuations in ambient humidity. In some examples, an operating parameter or parameters of only the active engine bank may be adjusted based on the retrieved humidity, fuel alcohol content, and/or air-fuel ratio. In other examples, an operating parameter or parameters of both the active and inactive engine banks may be adjusted based on the retrieved humidity, fuel alcohol content, and/or air-fuel ratio.

In one example embodiment, an amount of EGR may be adjusted based on the measured ambient humidity. For example, in one condition, the water concentration in the air surrounding the vehicle may have increased due to a weather condition such as fog; thus, a higher humidity is detected by the exhaust gas sensor during engine non-fueling conditions. In response to the increased humidity measurement, during subsequent engine fueling operation, the EGR flow into at least one combustion chamber may be reduced. As a result, engine efficiency may be maintained.

Responsive to a fluctuation in absolute ambient humidity, EGR flow may be increased or decreased in at least one combustion chamber. As such, the EGR flow may be increased or decreased in only one combustion chamber, in some combustion chambers, or in all combustion chambers. Furthermore, the magnitude of change of the EGR flow may be the same for all cylinders or the magnitude of change of the EGR flow may vary by cylinder based on the specific operating conditions of each cylinder.

In another embodiment, spark timing may be adjusted responsive to the ambient humidity, fuel alcohol content, and/or air-fuel ratio. In at least one condition, for example, spark timing may be advanced in one or more cylinders during subsequent engine fueling operation responsive to a higher humidity reading. Spark timing may be scheduled so as to reduce knock in low humidity conditions (e.g., retarded from a peak torque timing), for example. When an increase in humidity is detected by the exhaust gas sensor, spark timing may be advanced in order to maintain engine performance and operate closer to or at a peak torque spark timing.

Additionally, spark timing may be retarded in response to a decrease in ambient humidity. For example, a decrease in ambient humidity from a higher humidity may cause knock. If the decrease in humidity is detected by the exhaust gas sensor during non-fueling conditions, such as DFSO, spark timing may be retarded during subsequent engine fueling operation and knock may be reduced.

It should be noted that spark may be advanced or retarded in one or more cylinders during subsequent engine fueling operation. Further, the magnitude of change of spark timing may be the same for all cylinders and/or engine banks or one or more cylinders may have varying magnitudes of spark advance or retard.

In still another example embodiment, exhaust gas air-fuel ratio may be adjusted responsive to the measured ambient humidity, fuel alcohol content, and/or air-fuel ratio during subsequent engine fueling operation. For example, an engine may be operating with a lean air fuel ratio optimized for low humidity. In the event of an increase in humidity, the mixture may become diluted, resulting in engine misfire. If the increase in humidity is detected by the exhaust gas sensor during non-fueling conditions, however, the air fuel ratio may be adjusted (e.g., by adjusting fuel injection) so that the engine will operate with a less lean, lean air fuel ratio during subsequent fueling operation. Likewise, an air fuel ratio may be adjusted to be a more lean air fuel ratio during subsequent engine fueling operation in response to a measured decrease in ambient humidity or a measured increase in exhaust air-fuel ratio. In this way, conditions such as engine misfire due to humidity fluctuations may be reduced.

In some examples, an engine may be operating with a stoichiometric air fuel ratio or a rich air fuel ratio. As such, the air fuel ratio may be independent of ambient humidity and measured fluctuations in humidity may not result in an adjustment of air fuel ratio.

Turning back to 602, if it is determined that the engine is not operating in VDE mode, the routine moves to 610 where the ambient humidity estimate based on the exhaust gas sensor coupled to the inactive cylinder bank during the preceding VDE mode is retrieved.

At 612, the fuel alcohol content and/or air-fuel ratio estimated based on the exhaust gas sensor coupled to the active cylinder bank during the preceding VDE mode is retrieved.

Once the fuel alcohol content and/or air-fuel ratio estimates are retrieved, the routine continues to 614 where one or more engine operating parameters is adjusted based on the retrieved estimates. As examples, the engine operating parameters may include amount of exhaust gas recirculation, spark timing, fuel injection amount, engine air-fuel ratio, etc., as described above.

For example, the stoichiometric air-fuel ratio may decrease as fuel alcohol content increases, so the desired air-fuel ratio and bias may be accordingly adjusted. The engine may also be able to tolerate more spark advance as the fuel alcohol content increases. If the octane of the gasoline is the same and only the alcohol content increases, more spark advance can be tolerated. The amount of fuel injected may also have to be increased to provide an equivalent amount of engine torque.

Thus, one or more engine operating parameters may be adjusted responsive to the estimates of ambient humidity, fuel alcohol content, and/or air-fuel ratio inferred from the exhaust gas sensors coupled to active and inactive cylinder banks during the VDE mode of engine operation.

In this way, non-fueling conditions on a selectively deactivated engine bank can be advantageously used to perform a humidity estimation at a downstream exhaust gas oxygen sensor. This reduces delays in humidity estimation incurred due to the need for waiting for a DFSO condition. By modulating the reference voltage of the exhaust gas oxygen sensor coupled to the selectively deactivated engine bank, and estimating humidity based on a resulting change in sensor pumping current, the effect of any changing air fuel ratio on the sensor output is also nullified. By concurrently estimating a fuel ethanol content and an exhaust air-fuel ratio at an exhaust gas oxygen sensor coupled to the active bank, all the estimations can be completed in a shorter amount of time.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for an engine, comprising:
while a first engine bank is deactivated,
alternating applying each of a first, lower reference voltage and a second, higher reference voltage to a first exhaust gas sensor coupled downstream of the first bank;
inferring an ambient humidity based on a difference between a first pumping current output by the first sensor upon applying of the first voltage and a second pumping current output by the first sensor upon applying of the second voltage;
employing an engine actuator to adjust an operating parameter of a second, active engine bank based on the inferred ambient humidity; and
selectively reactivating the first engine bank based on the inferring of ambient humidity, the selectively reactivating being delayed in response to one of the inferring being incomplete and the inferred ambient humidity being higher than a threshold, the threshold based on engine knock limits.

2. The method of claim 1, further comprising, deactivating the first engine bank by deactivating fuel and spark in response to engine load.

3. The method of claim 1, further comprising,
alternating applying each of the first voltage and the second voltage to a second exhaust gas sensor coupled downstream of the second bank;
inferring an ethanol content of burned fuel based on a difference between a first pumping current output by the second sensor upon applying of the first voltage and a second pumping current output by the second sensor upon applying of the second voltage; and
further adjusting the operating parameter of the second engine bank based on the inferred ethanol content.

4. The method of claim 3, further comprising,
applying the first voltage to the second exhaust gas sensor;
inferring an exhaust air-fuel ratio based on the first pumping current output by the second sensor upon applying of the first voltage; and
adjusting fuel injection to the second bank based on a difference between the inferred exhaust air-fuel ratio and a threshold ratio.

5. The method of claim 4, further comprising, following reactivation of the first bank, adjusting an operating parameter of both the first and second engine banks based on one or more of the inferred ambient humidity, and the inferred ethanol content.

6. The method of claim 5, wherein the operating parameter includes one or more of an amount of exhaust gas recirculation, spark timing, and engine air fuel ratio.

7. A method for an engine, comprising:
selectively deactivating a first group of cylinders while maintaining a second group of cylinders active;
modulating a reference voltage of a first exhaust gas sensor coupled downstream of the first group of cylinders between a first, lower voltage and a second, higher voltage;
inferring an ambient humidity based on sensor output generated by the first sensor responsive to the modulating;
employing an engine actuator to adjust an engine operating parameter of the second group of cylinders based on the inferred ambient humidity;
during a first condition while the first group of cylinders are deactivated, applying the first voltage to a second exhaust gas sensor coupled downstream of the second, active group of cylinders and not the first exhaust gas sensor;
estimating an exhaust air-fuel ratio based on an output of the second sensor; and
adjusting fuel injection to the second group of cylinders based on the estimated exhaust air-fuel ratio.

8. The method of claim 7, wherein selectively deactivating the first group of cylinders includes deactivating fuel via selectively deactivatable fuel injectors and spark to the first group of cylinders.

9. The method of claim 7, wherein the engine operating parameter includes one or more of an amount of exhaust gas recirculation, spark timing, and fuel injection amount.

10. The method of claim 7, wherein modulating the reference voltage includes switching the reference voltage between the first, lower voltage and the second, higher voltage, the second voltage enabling dissociation of water molecules while the first voltage not enabling dissociation of water molecules.

11. The method of claim 10, wherein the first and second exhaust gas sensors are exhaust gas oxygen sensors.

12. The method of claim 10, wherein the first group of cylinders are coupled to a first engine bank and wherein the second group of cylinders are coupled to a second, different engine bank and wherein the first exhaust gas sensor is coupled to an emission control device located downstream of the first engine bank but not the second engine bank, and wherein the second exhaust gas sensor is coupled to an emission control device located downstream of the second engine bank but not the first engine bank.

13. The method of claim 10, further comprising, selectively reactivating the first group of cylinders based on the inferring of ambient humidity, the reactivating delayed until the inferring of ambient humidity is completed.

14. The method of claim 13, wherein the selectively reactivating the first group of cylinders is further based on the inferred ambient humidity, the selectively reactivating delayed in response to the inferred ambient humidity being higher than a threshold.

15. The method of claim 10, further comprising,
during a second condition while the first group of cylinders are deactivated, modulating the reference voltage of the second exhaust gas sensor between the first voltage and the second voltage;
estimating an alcohol content of fuel burned in the engine based on outputs of the second sensor at the first and second voltages; and
further adjusting fuel injection to the second group of cylinders based on the estimated fuel alcohol content.

16. The method of claim 15, wherein the second higher voltage enables dissociation of water molecules while the first, lower voltage does not, and wherein inferring the ambient humidity based on sensor output generated by the first sensor responsive to the modulating includes inferring ambient humidity based on a difference between a first pumping current output by the first sensor at the first voltage and a second pumping current output by the first sensor at the second voltage, the first pumping current indicative of an amount of oxygen, the second pumping current indicative of an amount of oxygen and water.

17. The method of claim 16, wherein estimating the alcohol content includes estimating a water content of the burned fuel based on a difference between a first pumping current output by the second sensor at the first voltage and a second pumping current output by the second sensor at the second voltage, the first pumping current indicative of an amount of oxygen, the second pumping current indicative of an amount of oxygen and water; and inferring the alcohol content based on the estimated water content.

18. A system, comprising:
an engine with a first group of cylinders on a first engine bank and a second group of cylinders on a second engine bank;
selectively deactivatable fuel injectors coupled to the first and second groups of cylinders;
a first exhaust gas oxygen sensor coupled downstream of the first engine bank;
a second exhaust gas oxygen sensor coupled downstream of the second engine bank; and
a control system in communication with the first and second sensors, the control system including non-transitory instructions to:
selectively deactivate fuel and spark to the first group of cylinders;
modulate a reference voltage of the first sensor between a first voltage and a second voltage;
generate an indication of ambient humidity based on a change in pumping current output by the first sensor responsive to the modulation of the reference voltage;
delay reactivation of the first group of cylinders until the modulating of the reference voltage is complete; and
adjust fuel and spark to the active second group of cylinders based on the indication of ambient humidity.

19. The system of claim 18, wherein the engine is a variable displacement engine.

20. The system of claim 18, wherein adjusting fuel and spark includes, responsive to an indication of higher humidity, advancing spark timing and adjusting fuel injection to transition to an air-fuel ratio that is leaner than stoichiometry.

* * * * *